(12) United States Patent
Tsai et al.

(10) Patent No.: US 7,554,703 B2
(45) Date of Patent: Jun. 30, 2009

(54) OPTICAL READING DEVICE OF SCANNING APPARATUS

(75) Inventors: Yi-Yuan Tsai, Taipei (TW); Yu-Cheng Chang, Taipei (TW)

(73) Assignee: Primax Electronics Ltd, Taipei (TW)

( * ) Notice: Subject to any disclaimer, the term of this patent is extended or adjusted under 35 U.S.C. 154(b) by 656 days.

(21) Appl. No.: 11/373,542

(22) Filed: Mar. 10, 2006

(65) Prior Publication Data

US 2007/0139728 A1    Jun. 21, 2007

(30) Foreign Application Priority Data

Dec. 16, 2005    (TW) ............................... 94144631 A

(51) Int. Cl.
*H04N 1/04*    (2006.01)
(52) U.S. Cl. .................. 358/483; 358/475; 358/496; 358/497; 358/498; 358/408
(58) Field of Classification Search .................. 358/483, 358/482, 475, 496, 497, 498, 474, 505, 512–514, 358/408; 250/208.1, 239, 216, 234–236; 399/211, 212, 367, 364, 374; 355/23, 24
See application file for complete search history.

(56) References Cited

U.S. PATENT DOCUMENTS

| | | | | | |
|---|---|---|---|---|---|
| 4,536,077 | A | * | 8/1985 | Stoffel | 358/497 |
| 5,532,845 | A | * | 7/1996 | Gusmano | 358/474 |
| 5,751,446 | A | * | 5/1998 | Fujioka | 358/474 |
| 6,421,158 | B1 | * | 7/2002 | Yeh | 359/212 |
| 7,289,242 | B2 | * | 10/2007 | Lai | 358/1.6 |

* cited by examiner

*Primary Examiner*—Cheukfan Lee
(74) *Attorney, Agent, or Firm*—Apex Juris, pllc; Tracy M Heims

(57) ABSTRACT

An optical reading device of a scanning apparatus includes two light sources and a movable lens. The first light source emits a first light when the optical reading device is operated in a flatbed scanning mode. The second light source emits a second light when the optical reading device is operated in a sheetfed scanning mode. The movable mirror is selected to allow for passing the first light without being obstructed by the movable mirror in the flatbed scanning mode or allow for reflecting the second light coming from the second mirror in the sheetfed scanning mode. Due to the special design, the overall volume of the scanning module is reduced.

4 Claims, 3 Drawing Sheets

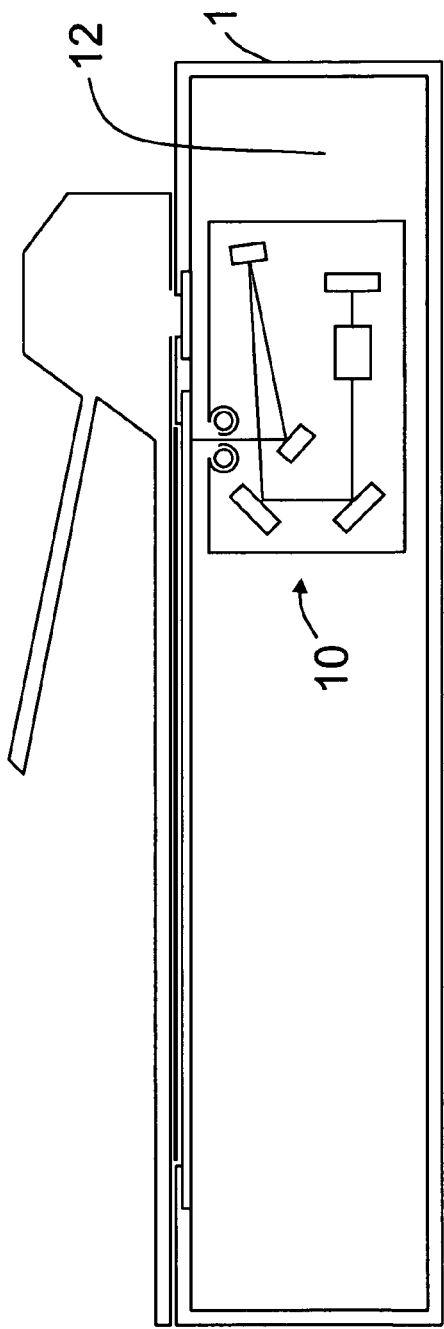
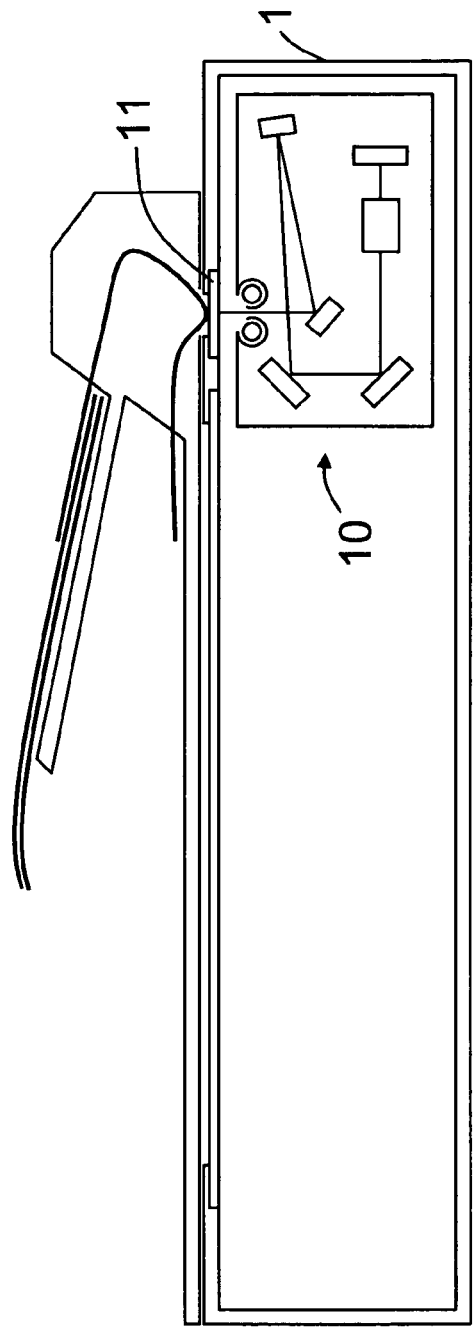
FIG. 1A (PRIOR ART)
FIG. 1B (PRIOR ART)

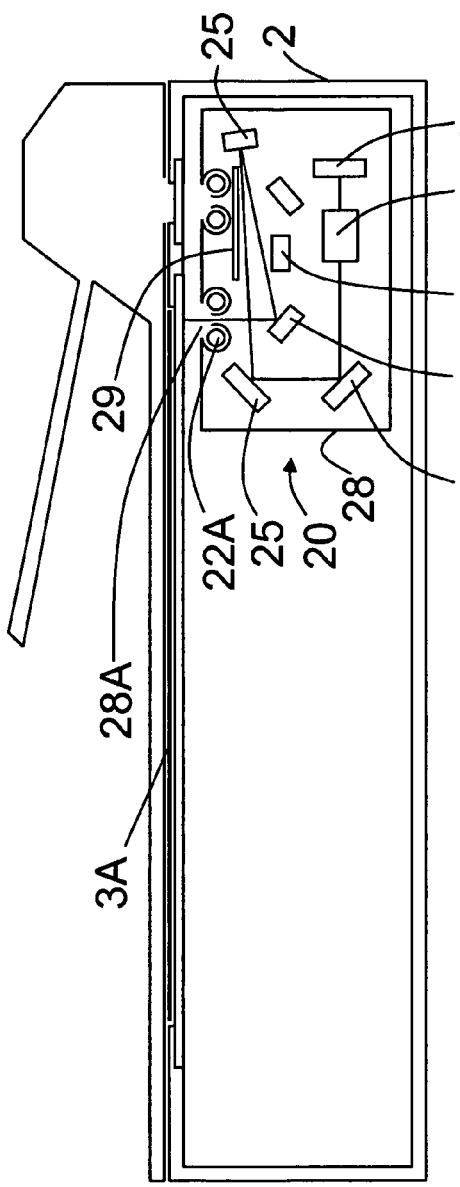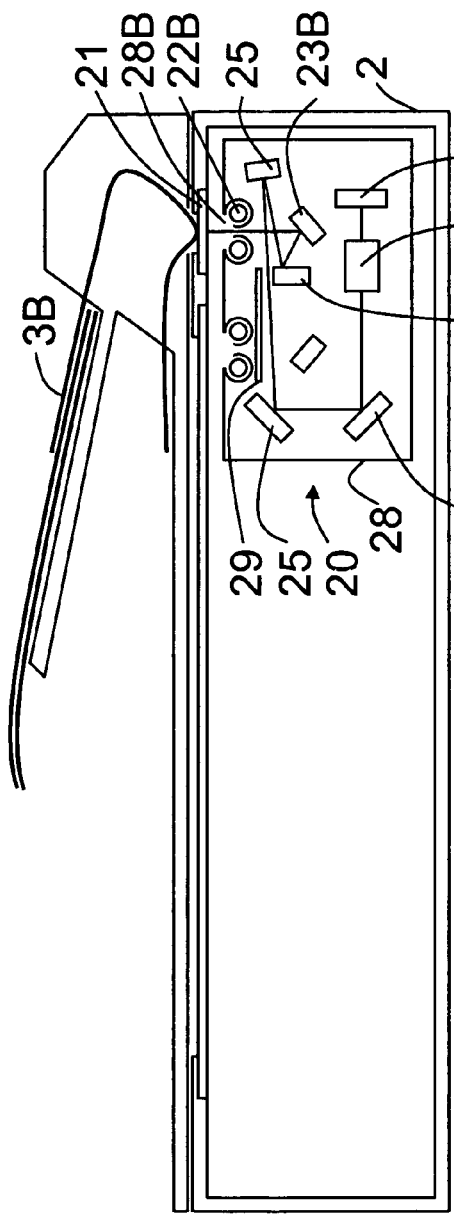

OPTICAL READING DEVICE OF SCANNING APPARATUS

FIELD OF THE INVENTION

The present invention relates to an optical reading device of a scanning apparatus, and more particularly to an optical reading device having dual light sources and a light path adjustable mechanism.

BACKGROUND OF THE INVENTION

Image scanners are widely used for scanning documents. Image scanners are generally classified as two major types: flatbed scanners and sheetfed scanners. In the flatbed scanner, a document is firstly placed on the glass platform, and then the optical reading device is driven by a driving device (not shown) to scan the document. For a purpose of successively scanning many paper sheets at a time, an automatic paper feeder (ADF), which is usually used in the sheetfed scanner, is integrated into the flatbed scanner. Under this circumstance, the flatbed scanner having the automatic paper feeder (ADF) is capable of performing dual-mode scanning operations. For clarification, such a scanner is referred as a dual-mode scanner hereinafter. Referring to FIG. 1A and FIG. 1B, a dual-mode scanner capable of respectively scanning a single paper sheet in the flatbed scanning mode and a lot of paper sheets in the sheetfed scanning mode is illustrated.

As shown in FIG. 1A and FIG. 1B, the dual-mode scanner 1 has an optical reading device 10 similar to that used in the general flatbed scanner. During the process of performing the sheetfed scanning operation, the optical reading device 10 should be moved under the scanning window 11 such that the light emitted from the optical reading device 10 can be projected onto the scanning window 11. Therefore, it is required to reserve an additional operative space 12 for accommodating the optical reading device 10 when the dual-mode scanner 1 is operated in the sheetfed scanning mode. Likewise, the overall volume of the scanner 1 is increased.

In views of the above-described disadvantages of the prior art, the applicant keeps on carving unflaggingly to develop an improved optical reading device of a scanning apparatus according to the present invention through wholehearted experience and research.

SUMMARY OF THE INVENTION

It is an object of the present invention to provide an optical reading device of a scanning apparatus, in which the operative space for accommodating the optical reading device when the dual-mode scanner is operated in the sheetfed scanning mode is reduced and thus the overall volume of the scanner is also reduced.

In accordance with an aspect of the present invention, there is provided an optical reading device of a scanning apparatus. The optical reading device comprises a housing, a first light source, a second light source, a first mirror, a second mirror, a movable mirror, a mirror set, a lens set and an optical sensing module. The housing has a first slot and a second slot in a surface thereof. The first light source is disposed beside the first slot for providing a first light when the optical reading device is operated in a flatbed scanning mode. The second light source is disposed beside the second slot for providing a second light when the optical reading device is operated in a sheetfed scanning mode. The first mirror is disposed under the first slot for reflecting the first light entered via the first slot. The second mirror is disposed under the second slot for reflecting the second light entered via the second slot. The movable mirror is selected to allow for passing the first light without being obstructed by the movable mirror in the flatbed scanning mode or allow for reflecting the second light coming from the second mirror in the sheetfed scanning mode. The mirror set successively reflects the first light coming from the first mirror in the flatbed scanning mode and successively reflects the second light coming from the movable mirror. The lens set focuses the first light coming from the mirror set in the flatbed scanning mode and focuses the second light coming from the mirror set in the sheetfed scanning mode. The optical sensing module receives the first light and the second light and converts the first light and the second light into electrical signals. The first light source, the second light source, the first mirror, the second mirror, the movable mirror, the mirror set, a lens set and the optical sensing module are contained inside the housing.

In an embodiment, the first mirror and the second mirror are symmetrically arranged at opposite sides of an image plane.

In an embodiment, the reflective surface of the movable mirror is aligned with the image plane when the optical reading device is operated in the sheetfed scanning mode.

In an embodiment, the optical reading device further comprises a movable light shield plate selectively to be moved under the first slot for shielding the first slot when the optical reading device is operated in the sheetfed scanning mode or under the second slot for shielding the second slot when the optical reading device is operated in the flatbed scanning mode.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 1A and FIG. 1B are schematic views illustrating a dual-mode scanner selectively operated in a flatbed scanning mode or a sheetfed scanning mode according to prior art, respectively;

FIG. 2A and FIG. 2B are schematic views illustrating a dual-mode scanner selectively operated in a flatbed scanning mode or a sheetfed scanning mode according to a preferred embodiment of the present invention, respectively.

DETAILED DESCRIPTION OF THE PREFERRED EMBODIMENT

Figure 3A:
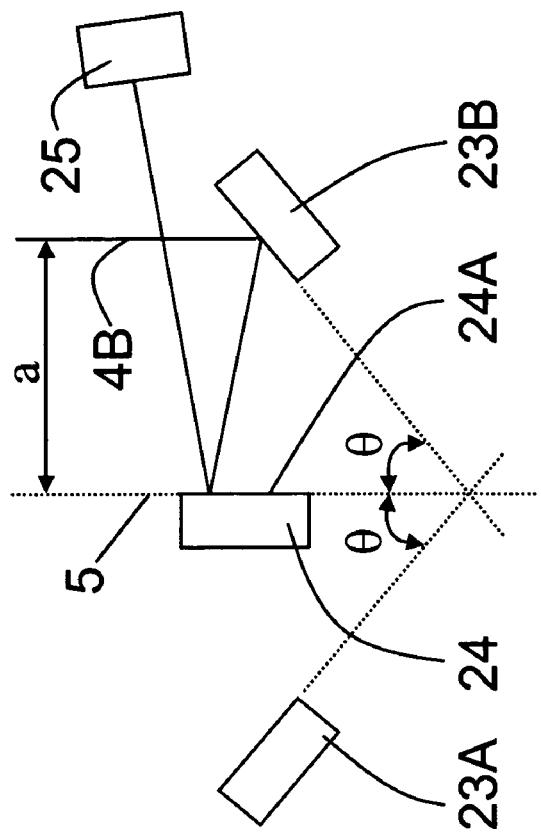
FIG. 3A and FIG. 3B are schematic views illustrating the relative locations of the mirrors and the movable mirror when the dual-mode scanner is operated in the flatbed scanning mode and the sheetfed scanning mode, respectively.

Referring to FIG. 2A and FIG. 2B, a dual-mode scanner for respectively scanning a single paper sheet in the flatbed scanning mode and a lot of paper sheets in the sheetfed scanning mode according to a preferred embodiment of the present invention is illustrated. The dual-mode scanner of the present invention is distinguished by the optical reading device and the optical path adjustable mechanism.

As shown in FIG. 2A and FIG. 2B, the optical reading device 20 of the dual-mode scanner 2 comprises light sources 22A and 22B, mirrors 23A and 23B, a movable mirror 24, a mirror set 25, a lens set 26 and an optical sensing module 27, which are contained inside a housing 28. The housing 28 has two slots 28A and 28B disposed above the light sources 22A and 22B, respectively. When the dual-mode scanner 2 is operated in the flatbed scanning mode as shown in FIG. 2A, the light emitted from the light source 22A is projected onto the document 3A to be scanned, and the light reflected from the scanned document 3A enters the slot 28A of the housing 28. Whereas, when the dual-mode scanner 2 is operated in the sheetfed scanning mode as shown in FIG. 2B, the light emitted from the light source 22B is projected onto the documents 3B to be scanned, and the light reflected from the scanned document 3B enters the slot 28B of the housing 28.

Due to the slots 28A and 28B in the housing 28 of the optical reading device 20, the optical reading device 20 only needs to be slightly moved toward the right side when the dual-mode scanner 2 is switched from operation in the flatbed scanning mode to the sheetfed scanning mode, so that the slot 28B is moved to the location just below the scanning window 28. Alternatively, if the location of the slot 28B is just below the scanning window 21 according to the manufacture's design, the optical reading device 20 needs not be moved rightwards when the dual-mode scanner 2 is switched from operation in the flatbed scanning mode to the sheetfed scanning mode. Under this circumstance, it is not required to reserve an additional operative space to accommodate the optical reading device 20 when the dual-mode scanner 2 is operated in the sheetfed scanning mode.

In some embodiments of the optical reading device 20, each of the light sources 22A and 22B includes two lamps or a single lamp. When the dual-mode scanner 2 is operated in the flatbed scanning mode as shown in FIG. 2A, the light source 22A is turned on but the light source 22B is turned off. Whereas, when the dual-mode scanner 2 is operated in the sheetfed scanning mode as shown in FIG. 2B, the light source 22B is turned on but the light source 22A is turned off.

Please refer to FIG. 2A and FIG. 2B again. The optical reading device 20 further comprises a movable light shield plate 29 selectively to be moved under the slot 28A or 28B. When the dual-mode scanner 2 is operated in the flatbed scanning mode as shown in FIG. 2A, the light shield plate 29 is moved to the location under the slot 28B so as to prevent the external stray light from entering the slot 28B of the housing 28. Whereas, when the dual-mode scanner 2 is operated in the sheetfed scanning mode as shown in FIG. 2B, the light shield plate 29 is moved to the location under the slot 28A so as to prevent the external stray light from entering the slot 28A of the housing 28.

Please refer to FIG. 2A and FIG. 2B again. The optical reading device 20 further comprises two mirrors 23A and 23B under the slots 28A and 28B, respectively. When the dual-mode scanner 2 is operated in the flatbed scanning mode as shown in FIG. 2A, the light emitted from the light source 22A is projected onto the document 3A to be scanned. In the flatbed scanning mode, the light reflected from the scanned document 3A then enters the slot 28A and is successively reflected by the mirror 23A and the mirror set 25. Whereas, when the dual-mode scanner 2 is operated in the sheetfed scanning mode as shown in FIG. 2B, the light emitted from the light source 22B is projected onto the documents 3B to be scanned. In the sheetfed scanning mode, the light reflected from the scanned documents 3B then enters the slot 28B and is successively reflected by the mirror 23B, a movable mirror 24 and the mirror set 25. It is noted that the tilt angle of the movable mirror 24 of the optical reading device 20 is adjustable depending on the scanning modes. For example, when the dual-mode scanner 2 is operated in the flatbed scanning mode as shown in FIG. 2A, the tilt angle of the movable mirror 24 is small or zero. Under this circumstance, the light reflected from the mirror 23A would be transmitted to the mirror set 25 without being obstructed by the movable mirror 24. In contrast, when the dual-mode scanner 2 is operated in the sheetfed scanning mode as shown in FIG. 2B, the movable mirror 24 is substantially adjusted to a vertical position, and thus the light reflected from the mirror 23B would be successively reflected by the movable mirror 24 and the mirror set 25.

The optical paths of the optical reading device 20 are also illustrated with reference to FIG. 2A and FIG. 2B. When the dual-mode scanner 2 is operated in the flatbed scanning mode as shown in FIG. 2A, the light emitted from the light source 22A is projected onto the document 3A to be scanned. Then, the light reflected from the scanned document 3A enters the slot 28A, is successively reflected by the mirror 23A and the mirror set 25, and focused by the lens set 26. The focused light is then imaged onto the optical sensing module 27 such as a charge couple device (CCD) so as to convert the optical signals into electrical signals. In contrast, when the dual-mode scanner 2 is operated in the sheetfed scanning mode as shown in FIG. 2B, the light emitted from the light source 22B is projected onto the documents 3B to be scanned. Then, the light reflected from the scanned document 3B enters the slot 28B, is successively reflected by the mirror 23B, the movable mirror 24 and the mirror set 25, and focused by the lens set 26. Afterwards, the focused light is imaged onto the optical sensing module 27 so as to convert the optical signals into electrical signals.

Figure 3B:
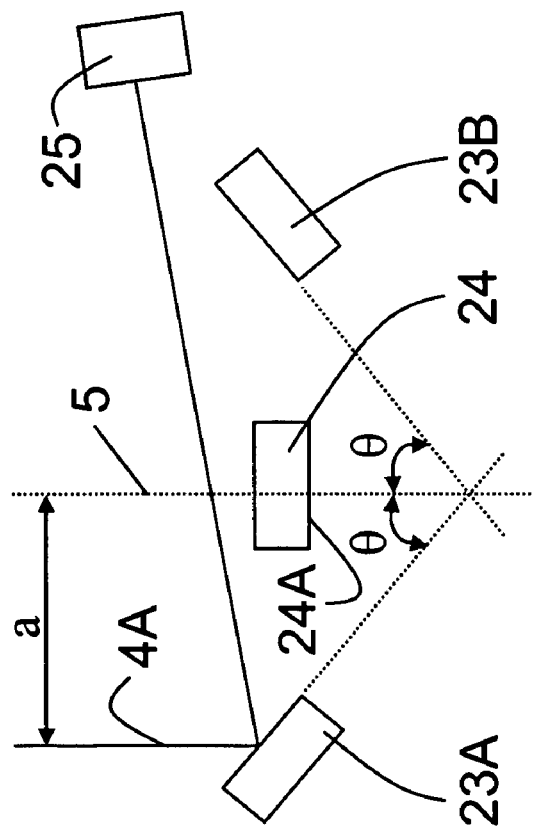

Referring to FIG. 3A and FIG. 3B, the relative locations of the mirror 23A, the mirror 23B and the movable mirror 24 inside the housing 28 of the optical reading device 20 are illustrated. It is preferred that the mirrors 23A and 23B are symmetrically arranged at opposite sides of an image plane 5. In such manner, when the dual-mode scanner 2 is operated in the sheetfed scanning mode as shown in FIG. 2B and the movable mirror 24 is substantially adjusted to a vertical position, the reflective surface of the movable mirror 24 is aligned with the image plane 5. Accordingly, the distance of the optical path in the flatbed scanning mode is substantially identical to that in the sheetfed scanning mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical reading device of a scanning apparatus, comprising:
    a housing having a first slot and a second slot in a surface thereof;
    a first light source beside said first slot for providing a first light when said optical reading device is operated in a flatbed scanning mode;
    a second light source beside said second slot for providing a second light when said optical reading device is operated in a sheetfed scanning mode;
    a first mirror disposed under said first slot for reflecting said first light entered via said first slot;
    a second mirror disposed under said second slot for reflecting said second light entered via said second slot;
    a movable mirror selected to allow for passing said first light without being obstructed by said movable mirror in said flatbed scanning mode or allow for reflecting said second light coming from said second mirror in said sheetfed scanning mode;

a mirror set for successively reflecting said first light coming from said first mirror in said flatbed scanning mode and successively reflecting said second light coming from said movable mirror;

a lens set for focusing said first light coming from said mirror set in said flatbed scanning mode and focusing said second light coming from said mirror set in said sheetfed scanning mode; and an optical sensing module for receiving said first light and said second light and converting said first light and said second light into electrical signals, wherein said first light source, said second light source, said first mirror, said second mirror, said movable mirror, said mirror set, said lens set and said optical sensing module are contained inside said housing.

2. The optical reading device according to claim 1 wherein said first mirror and said second mirror are symmetrically arranged at opposite sides of an image plane.

3. The optical reading device according to claim 2 wherein the reflective surface of said movable mirror is aligned with said image plane when said optical reading device is operated in said sheetfed scanning mode.

4. The optical reading device according to claim 1 further comprising a movable light shield plate selectively to be moved under said first slot for shielding said first slot when said optical reading device is operated in said sheetfed scanning mode or under said second slot for shielding said second slot when said optical reading device is operated in said flatbed scanning mode.

* * * * *